Aug. 4, 1964  R. D. CECIL ETAL  3,143,090
SOIL TREATING APPARATUS

Filed May 4, 1962  3 Sheets-Sheet 1

INVENTORS
Robert D. Cecil
BY Charles H. Cecil Jr.

ATTORNEYS

Aug. 4, 1964  R. D. CECIL ETAL  3,143,090
SOIL TREATING APPARATUS
Filed May 4, 1962  3 Sheets-Sheet 2
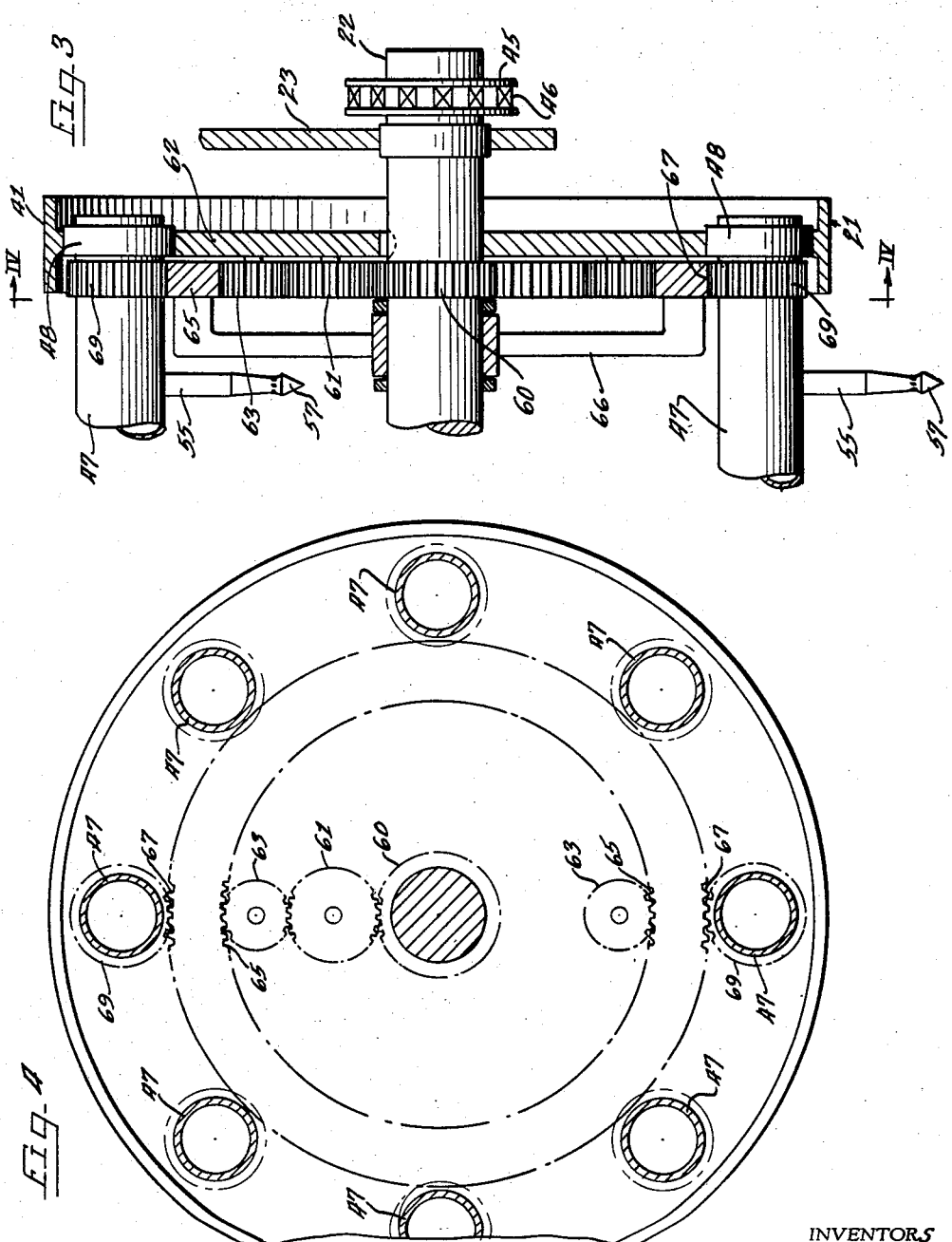
INVENTORS
Robert D. Cecil
Charles H. Cecil Jr.
BY
ATTORNEYS

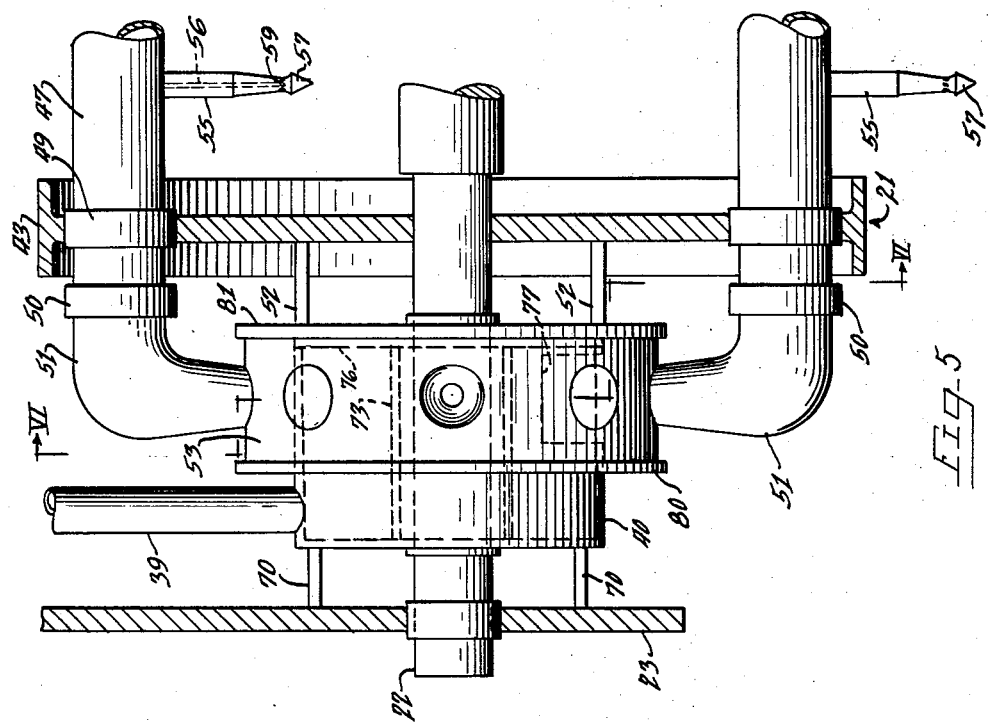
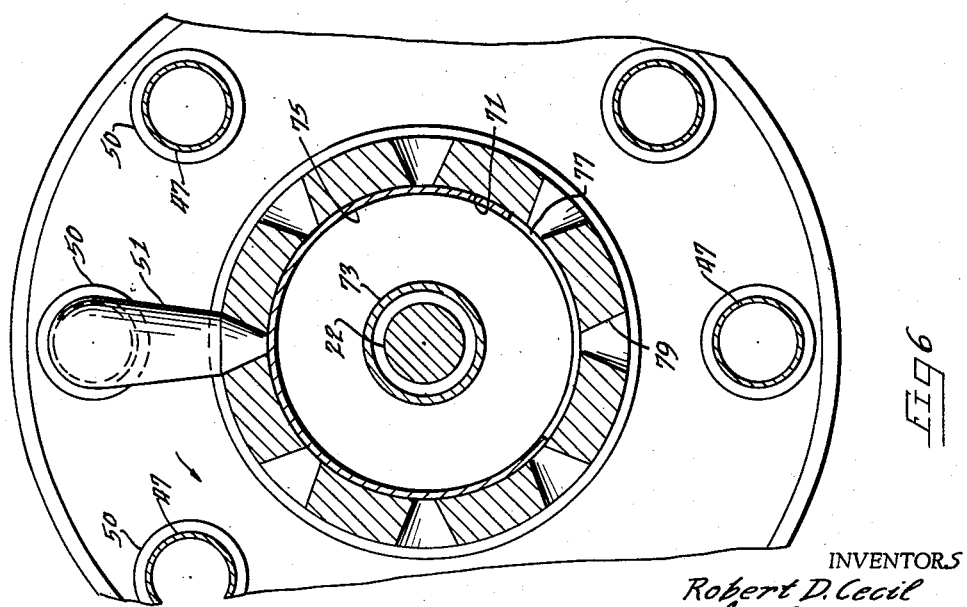

United States Patent Office 3,143,090
Patented Aug. 4, 1964

3,143,090
SOIL TREATING APPARATUS
Robert D. Cecil and Charles H. Cecil, Jr., both of R.R. 3, Grand Detour, Ill.
Filed May 4, 1962, Ser. No. 192,418
1 Claim. (Cl. 111—6)

This invention relates to soil treating apparatus and more particularly relates to an apparatus for injecting soil treating liquid in the ground.

A principal object of the invention is to provide a new and improved soil treating apparatus for injecting soil treating liquid in the ground with a minimum disturbance of the ground.

Another object of the invention is to provide a soil treating apparatus particularly adapted for the lawns of golf courses, parks, and the like so arranged as to aerate the ground and directly inject soil treating liquid into the ground, without unduly disrupting the turf.

Still another object of the invention is to improve upon the liquid fertilizing mechanisms heretofore in use by penetrating the ground in a straight down direction and injecting fertilizer into the ground during penetration thereof.

Still another object of the invention is to provide an improved form of soil treating mechanism in which soil treating liquid is injected into the ground through hollow spikes, and in which a novel form of drive to the spikes is provided to position the spikes to effect penetration and withdrawal of the spikes into and from the ground in directions generally perpendicular to the ground, to thereby avoid disturbance of the ground during the operation of injecting soil treating liquid therein.

These and other objects of the invention will appear from time to time as the following specification proceeds and with reference to the accompanying drawings wherein:

FIGURE 3 is a fragmentary sectional view of the soil treating drum taken substantially along line III—III of FIGURE 1;

FIGURE 4 is a fragmentary section view taken substantially along line IV—IV of FIGURE 3;

FIGURE 5 is a partial fragmentary longitudinal sectional view taken through one end of the drum, showing the opposite end of the drum in section from the end shown in section in FIGURE 3; and FIGURE 6 is a fragmentary transverse sectional view taken substantially along line VI—VI of FIGURE 5.

Figure 1:
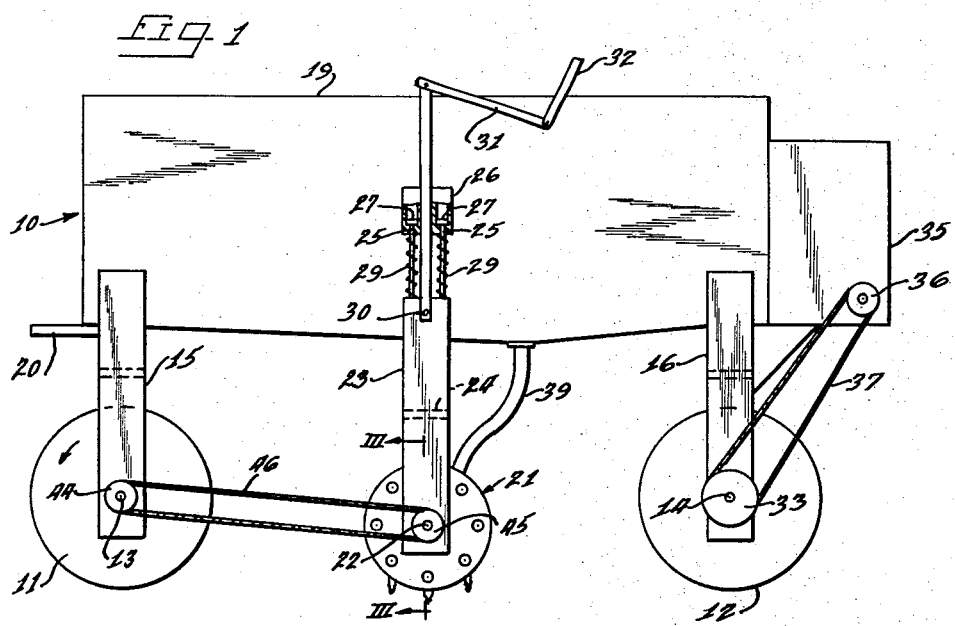
FIGURE 1 is a diagrammatic view in side elevation of a soil treating apparatus constructed in accordance with the invention.
Figure 2:
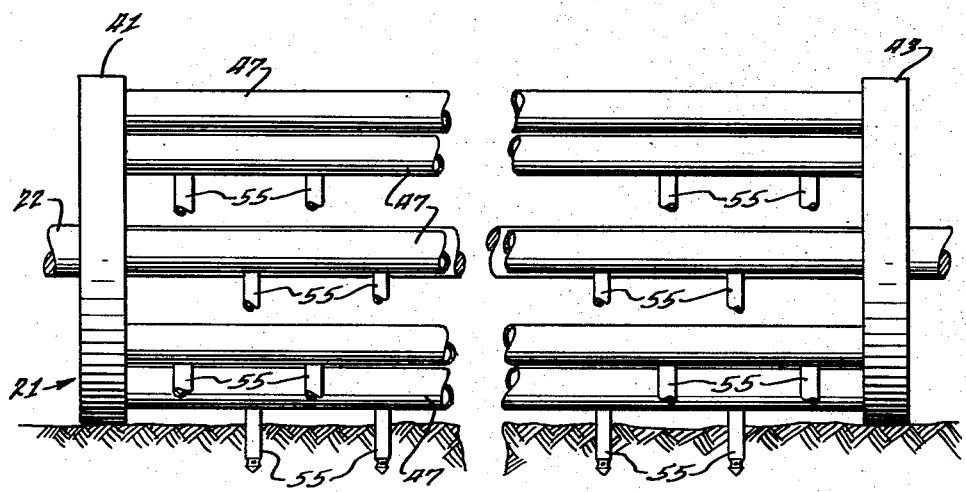
FIGURE 2 is a fragmentary end view of the soil treating drum having the penetrating spikes mounted thereon for penetrating the ground to inject fertilizer therein.

In the illustrative form of the invention diagrammatically shown in the drawings, we have shown in FIGURE 1 a truck or carriage 10 supported for movement along the ground on front wheels 11 and rear wheels 12. The wheels 11 and 12 are mounted on axles 13 and 14 respectively, shown as being rotatably mounted on leg structures 15 and 16 respectively, secured to opposite sides of a tank 19 adapted to contain soil treating liquid such as, liquid fertilizer, liquid weed killer or any other soil treating liquid required to treat the soil. A draw bar 20 extends from the front end of the carriage 10. The draw bar 20 is adapted to be connected to a tractor (not shown), which may be a lawn mower type of tractor, to accommodate the tractor to pull the carriage 10 along the ground.

Intermediate the front and rear wheels 11 and 12 is a soil treating drum 21 mounted on an axle shaft 22, journalled on legs 23 extending along opposite sides of the tank 19, and guided for slidable movement with respect thereto.

The legs 23 are connected together by a cross brace 24 spaced beneath the tank 19 and have parallel spaced rods 25 extending upwardly therefrom. Each pair of rods 25 is slidably guided in a guide block 26 mounted on the outer side of the tank 19 and extending laterally therefrom. The rods 25 have heads 27 on the upper ends thereof, limiting downward movement of the legs 23. Compression springs 29 encircle the rods 25 and are interposed between the legs 23 and the undersides of the guide blocks 26. The compression springs 29 yieldably bias the drum 21 toward the ground and accommodate upward movement of said drum as where the drum may encounter obstructions on the ground. A link 30 is pivotally connected to the leg 23 and extends upwardly therefrom and has its upper end pivotally and slidably connected to a lever 31, pivotally connected to the side of the tank 19. A hand lever 32 is connected to the lever 31 to pivot said lever and manually raise the drum 21 above the ground for transportation of the machine. A suitable latch (not shown), may be provided to hold the lever 32 and drum 21 in vertically spaced relation with respect to the ground.

The axle 14 is driven by the wheel 12, and is shown as having a sprocket 33 secured thereto for driving a compressor unit 35 carried by the carriage 10 and abutting the back side of the tank 19. The sprocket 33 drives a compressor unit drive sprocket 36 through an endless chain 37. The compressor unit 35 may be of any well known form so need not herein be shown in detail, and is provided to pressurize the tank 19 and force the liquid therein through a hose 39 connected with a supply drum 40 mounted on the shaft 22, and supplying liquid fertilizer to the soil treating drum 21, in a manner which will hereinafter be more clearly described as this specification proceeds.

The soil treating drum 21 includes spaced wheels 41 and 43 keyed or otherwise secured to the axle shaft 22 and rotatably driven from the front axle 13 through a chain and sprocket drive including a drive sprocket 44 keyed on the front axle 13 and a drive sprocket 45 keyed on the axle shaft 22 and driven from the drive sprocket 44 at the rotational speed of said drive sprocket, through an endless chain 46. When the soil treating drum 21 is in position to inject fertilizer into the ground, the axis of rotation of the sprocket 45 is positioned below the axis of rotation of the sprocket 44 and the chain tension is greater than when the axes are in horizontal alignment; to permit upward movement of the treating drum 21 against the springs 22 caused by the encountering of obstructions in the ground without increasing the tension of the chain 46.

The wheels 41 and 43 have a series of hollow shafts or tubes 47 journalled therein in bearing supports 48 and 49 respectively. The bearing supports 48 and 49 may form the outer races for needle bearings or for any other form of bearing, accommodating free rotation of the hollow shafts 47 with respect to the wheels 41 and 43 of the soil treating drum 21.

Each hollow shaft 47 is closed at the end journalled in the wheel 41 and has a coupling 50 at its opposite end connected to an elbow 51 leading from a manifold or fluid distributor 53 encircling the shaft 22 and connected with the wheel 43, for rotation therewith on supports 52. The coupling 50 may be of any conventional form which seals the elbow 51 to the hollow shaft 47, and accommodates rotation of said hollow shaft with respect to said elbow. Each hollow shaft 47 has a series of spaced aligned hollow spikes 55 extending radially therefrom and adapted to enter and to be withdrawn from the ground during each cycle of rotation of the treating drum 21. The spikes 55 may be threaded or otherwise secured to hollow shafts 47 and have interior passageways 56 extending therealong to the base of a conical head 57, the apex of which faces the ground. The passageway 56 has communication with a series of radial orifices 59, adjacent the head 57, and cross drilled through the spikes 55.

A means is provided to retain the spikes 55 in the depending positions shown in FIGURES 3 and 5 throughout each cycle of rotation of the treating drum 21, to assure that the spikes 55 will enter the ground and be withdrawn from the ground in directions perpendicular to the surface of the ground.

This means is shown in FIGURE 3 as being a spur gear 60 keyed or otherwise secured to the shaft 22 and meshing with an idler gear 61 suitably rotatably mounted on the inside of a web 62 of the wheel 41. The gear 61 meshes with a gear 63 rotatably carried by the web 62 of the wheel 41, which meshes with and drives an internal ring gear 65, shown as being formed integrally with a spider 66 mounted on the shaft 22 for free rotation with respect thereto. The ring gear 65 has external teeth 67 formed thereon meshing with spur gears 69 on the shafts 47 for rotatably driving said shafts at the speed of rotation of the wheel 41.

The gear train herein shown, driving the shafts 47 from the shaft 22 is shown for illustrative purposes only, it being understood that the gears must be so proportioned with respect to each other as to maintain the spikes 55 in vertical depending relation with respect to the hollow shafts 47, during each entire cycle of rotation of the treatment drum 21. The shafts 47 are thus in effect rotatably driven one revolution for each full revolution of the wheel 41 of the treatment drum 21, to effect the penetration into the ground and withdrawal of the spikes from the ground in directions generally perpendicular to the ground.

It should further be understood that the spikes 55 on the hollow shafts 47 may be arranged in staggered relation with respect to each other to effect the penetration of a maximum ground area and a uniform distribution of the soil treating liquid throughout the area covered by the treating drum 21.

Referring now particularly to the means for supplying liquid fertilizer to the hollow shafts 47, the supply drum 40 is held from rotation with respect to the shaft 22 by spaced supports 70 connected with an associated leg 23, forming a bearing support for the shaft 22. The supply drum extends within the distributor drum 53 along an inner cylindrical surface 71 of said distributor drum. As shown in FIGURES 5 and 6, the supply drum has an inner cylindrical wall 73 spaced radially from the shaft 22 and an outer cylindrical wall 75, the outer periphery of which slidably engages the inner cylindrical wall 71 of the distributor drum 53. An annular plate 76 is welded or otherwise secured to the inner ends of the cylindrical walls 73 and 75, to close the inner ends of said walls and to form a torroidal fluid chamber.

The outer cylindrical wall 75 of the supply drum 40 has a cut away portion 77, accommodating fluid under pressure to pass from the toroidal chamber through downwardly facing diverging outlets 79 leading radially through the drum 53 in communication with the elbows 51. Each outlet corresponds to a hollow shaft 47 and has an elbow 51 secured thereto and extending therefrom. The cylindrical wall 75 cooperating with the wall 71 of the distributor drum 70 thus forms a valve supplying the outlets 79 with soil treating liquid as they pass into the cut away portion 77. The drum 53 has an outer annular wall 80 having sealing engagement with the periphery of the stationary supply drum 40 and has an inner annular wall 81 having sealing engagement with a shaft 22. The sealing means between the walls 80 and 81 and the outer periphery of the supply drum 40 and the shaft 22 may be of conventional forms of seals and are no part of the present invention, so need not herein be shown or described.

It may be seen from FIGURES 5 and 6 that the outer wall 75 of the supply drum 40 acts as a valve and the cut away portions 77 of said wall accommodate the outlets 79 to be uncovered as the distributor drum or manifold 53 rotates about the supply drum, to supply liquid fertilizer to the outlet 79 as the associated hollow shaft 47 is moved downwardly toward the ground and as the spikes on said shaft are forced into the ground, and that the open portion 77 of the cylindrical wall of the supply drum is of sufficient circumferential length to effect the supply of fertilizer through the spikes 55, as long as said spikes are below the surface of the ground.

In operation of device, assuming the tank 19 is filled with liquid fertilizer, a tractor or the like is connected to the draw bar 20 to pull the device along the ground. Rotation of the front wheels 11 will effect rotation of treating drum 21 while rotation of the rear wheels 12 will drive the compressor unit 35 to pressurize the tank and force liquid under pressure through the flexible hose 39, to the supply and distributor drums 40 and 53 and into the lowermost hollow shaft 47 and row of spikes 55 projecting therefrom as said spikes enter the ground. The gear train between the driven shaft 22 and the hollow shaft 47 will drive the gears 69 secured to said hollow shaft one revolution for each revolution of the wheel 41 and the shaft 22, and will thus maintain the hollow spikes 55 in depending vertical positions during each entire cycle of rotation of the treating drum 21, to thereby hold the hollow spikes 55 in position to be driven directly into the ground perpendicular to the surface of the ground, and to be withdrawn from the ground perpendicular to the surface of the ground as soil treating liquid under pressure is furnished from said hollow spikes as they enter the ground.

While we have herein shown and described one form in which our invention may be embodied, it may readily be understood that various modifications and variations in the invention may be obtained without departing from the spirit and scope of the novel concepts thereof as defined by the claim appended hereto.

We claim as our invention:

In soil-treating apparatus, a carriage supported for movement over soil to be treated, leg means depending from said carriage, support means journalled by said leg means for rotation about a general horizontal axis, said support means including an axle and a pair of axially spaced wheels on said axle, a plurality of hollow shafts extending between and journalled by said wheels for rotation relative thereto about axes parallel to and at equal radial distances from said generally horizontal axis, said shafts being in circumferentially spaced relation with respect to said wheels to cooperate therewith in providing an open skeletonized assembly, a row of hollow spikes extending downwardly from each of said hollow shafts and having openings adjacent the lower ends thereof, geared drive connecting means between said hollow shafts and said leg means for holding said hollow shafts against rotation relative to said leg means and thereby maintaining said spikes in vertical positions, a fluid supply drum secured to said leg means having inner and outer cylindrical surfaces in coaxial relation to said generally horizontal axis and having an opening in the lower side thereof, means for supplying fluid to the interior of said drum, a fluid distributor drum carried by said support means in surrounding relation to said fluid supply drum and having a plurality of outlets each adapted to communicate with said fluid supply drum through said opening in said lower side thereof, a plurality of radially disposed elbows having ends coupled to said outlets and opposite ends disposed adjacent ends of said hollow shafts, and sealed coupling means between said opposite ends of said elbows and said ends of said hollow shafts for allowing flow of fluid to said hollow shafts while also allowing rotation of said hollow shafts relative to said elbows.

References Cited in the file of this patent

UNITED STATES PATENTS

| | | |
|---|---|---|
| 1,117,333 | Cooper | Nov. 17, 1914 |
| 1,171,277 | Thayer | Feb. 8, 1916 |
| 1,202,703 | Gladney | Oct. 24, 1916 |
| 1,490,222 | Martin | Apr. 15, 1924 |
| 2,649,061 | Hawkins | Aug. 18, 1953 |
| 2,690,145 | Romain | Sept. 28, 1954 |
| 2,768,570 | Strid | Oct. 30, 1956 |
| 2,789,522 | Barton | Apr. 23, 1957 |
| 2,845,884 | Clausing | Aug. 5, 1958 |
| 2,866,422 | Colson | Dec. 30, 1958 |